(12) United States Patent
Fallisgaard

(10) Patent No.: US 8,720,077 B1
(45) Date of Patent: May 13, 2014

(54) PHOTOGRAPHIC AID MEASURING TAPE

(76) Inventor: Niels Fallisgaard, Bainbridge Island, WA (US)

( * ) Notice: Subject to any disclaimer, the term of this patent is extended or adjusted under 35 U.S.C. 154(b) by 7 days.

(21) Appl. No.: 13/385,700

(22) Filed: Mar. 2, 2012

Related U.S. Application Data

(60) Provisional application No. 61/464,431, filed on Mar. 4, 2011.

(51) Int. Cl.
*G01B 3/10* (2006.01)

(52) U.S. Cl.
USPC .......................................... 33/759

(58) Field of Classification Search
USPC .......................................... 33/759
See application file for complete search history.

(56) References Cited

U.S. PATENT DOCUMENTS

| | | | |
|---|---|---|---|
| 3,902,182 A * | 8/1975 | Hillborg | 33/17 R |
| D259,706 S | 6/1981 | Smith | |
| D260,738 S | 9/1981 | Smith | |
| 4,310,509 A | 1/1982 | Berglund et al. | |
| 4,351,113 A | 9/1982 | Eggertsen et al. | |
| 4,367,590 A | 1/1983 | Winter et al. | |
| 4,370,039 A | 1/1983 | Landwehr | |
| 4,639,107 A | 1/1987 | Landwehr | |
| 4,732,808 A | 3/1988 | Krampe et al. | |
| 4,845,858 A | 7/1989 | Thomas | |
| 4,868,990 A * | 9/1989 | Steinberg | 33/15 |
| 4,885,844 A * | 12/1989 | Chun | 33/15 |
| 4,942,670 A | 7/1990 | Brandt | |
| 5,012,590 A | 5/1991 | Wagner et al. | |
| 5,107,601 A | 4/1992 | Semchuck | |
| 5,216,700 A | 6/1993 | Cherian | |
| 5,542,523 A | 8/1996 | Abbate et al. | |
| D399,769 S | 10/1998 | Taylor | |
| 5,956,525 A * | 9/1999 | Minsky | 33/15 |
| 6,067,722 A | 5/2000 | Goodyer et al. | |
| 6,082,018 A | 7/2000 | Wells | |
| 6,145,215 A | 11/2000 | Graston et al. | |
| 6,360,448 B1 | 3/2002 | Smyj | |
| 6,415,199 B1 | 7/2002 | Liebermann | |
| 6,511,741 B1 | 1/2003 | Hungarter | |
| 6,637,124 B2 | 10/2003 | Pederson | |
| 6,772,532 B1 | 8/2004 | Honea | |
| D510,286 S | 10/2005 | Manning | |
| 7,059,061 B2 | 6/2006 | French | |
| 7,173,197 B1 * | 2/2007 | Kasperek | 33/772 |
| 7,293,368 B1 * | 11/2007 | Faulk et al. | 33/758 |
| 7,363,723 B1 * | 4/2008 | Peterson | 33/760 |
| D571,239 S | 6/2008 | Holmes | |
| 7,581,333 B2 | 9/2009 | Dressler | |
| 8,356,419 B2 * | 1/2013 | Lord | 33/756 |
| 2001/0042315 A1 | 11/2001 | Dixon | |
| 2002/0148134 A1 | 10/2002 | Meyer et al. | |

(Continued)

FOREIGN PATENT DOCUMENTS

JP 57128801 8/1982

*Primary Examiner* — Yaritza Guadalupe-McCall
(74) *Attorney, Agent, or Firm* — Lowe Graham Jones PLLC

(57) ABSTRACT

A photographic aid measuring tape is formed of a flexible, tearable substrate having regularly spaced markings on the top side and an adhesive on the back side to allow the invention to be temporarily affixed to an object or item, such as a wall, ceiling or floor. The invention has markings of sufficient size to be readable in a photograph taken of the event using a digital camera and the image viewed using standard software on a conventional computer.

9 Claims, 3 Drawing Sheets

(56) References Cited

U.S. PATENT DOCUMENTS

2005/0257393 A1 11/2005 Spanski et al.
2007/0045010 A1* 3/2007 Kasperek ................... 33/772
2007/0283589 A1 12/2007 Garcia
2008/0086903 A1* 4/2008 Peterson ................... 33/760
2008/0201975 A1 8/2008 Gingerella et al.
2008/0209749 A1 9/2008 Chua
2008/0307666 A1 12/2008 Mattsson et al.
2010/0275456 A1* 11/2010 Lord ........................ 33/706

* cited by examiner

PHOTOGRAPHIC AID MEASURING TAPE

CROSS-REFERENCE TO RELATED APPLICATION(S)

This utility patent application claims priority from and the benefit of the filing date of co-pending Provisional Patent Application Ser. No. 61/464,431 filed Mar. 4, 2011 titled "PHOTOGRAPHIC AID MEASURING TAPE" by Niels Fallisgaard in accordance with 35 U.S.C. §§119(e) and 120.

TECHNICAL FIELD

The technical field is directed to photographic aids and more particularly as an adhesive backed measuring tape as a photographic aid in measuring objects or items of longer length.

BACKGROUND OF THE INVENTION

Photographic aids for creating a permanent digital photographic record of a measured long length, such as a wall, ceiling or floor of sufficient length as forms a typical room size, are limited. None are known to be in use in common practice. The following prior art references may be relevant to the instant invention.

| Title | Pat./Publication No. | Issue/Publication Date | Inventor |
| --- | --- | --- | --- |
| Carpenters' lay-off tape | D259,706 | June 1981 | Smith, Floyd A. |
| Carpenters' lay-off tape | D260,738 | September 1981 | Smith, Floyd A. |
| Pressure sensitive adhesive having a broad spectrum antimicrobial therein | 4,310,509 | January 1982 | Berglund, et al. |
| Pressure sensitive adhesively backed disposable measuring tape and method of manufacture | 4,351,113 | September 1982 | Eggertsen et al. |
| Calibrated tape for use in constructing wall with vertical studs | 4,367,590 | January 1983 | Winter et al. |
| Method and apparatus for photographically measuring an object | 4,370,039 | January 1983 | Landwehr, Ulrich M. |
| Acquiring measurements of an object by means of photography | 4,639,107 | January 1987 | Landwehr, Ulrich M. |
| Macromer reinforced pressure sensitive skin adhesive sheet material | 4,732,808 | March 1988 | Krampe et al. |
| Stud locating tape | 4,845,858 | July 1989 | Thomas, Ronald K. |
| Adhesive template tape | 4,942,670 | July 1990 | Brandt, Harold |
| Disposable layout tape | 5,012,590 | May 1991 | Wagner, et al. |
| Mounting template | 5,107,601 | April 1992 | Semchuck, Mario E. |
| Tape having graduated scale providing location indicia during x-ray processes | 5,216,700 | June 1993 | Cherian, George |
| Measuring material lengths | 5,542,523 | September 1995 | Jansen, George |
| Centering rule | D399,769 | October 1998 | Taylor, Christopher L. |
| Marking Tape | 6,067,722 | May 2000 | Goodyear, et al. |
| Pre-marked markready tape | 6,082,018 | July 2000 | Wells, Harold T. |
| Container space indicating tape and method | 6,145,215 | November 2000 | Graston, et al. |
| System for laying out an installation of components and method of use | 6,360,448 | March 2002 | Smyj, Brian Kenneth |
| Method and apparatus for preparing custom-fitted clothing | 6,415,199 | July 2002 | Liebermann, Gabriel S. A. |
| Roofing tape | 6,511,741 | January 2003 | Hungarter, Ronald C. |
| Adhesive measuring tape | 6,637,124 | October 2003 | Pederson, Jeffrey C. |
| Disposable tape measuring system | 6,772,532 | August 2004 | Honea, Richard |
| Ruler | D510,286 | October 2005 | Manning, Steven R. |
| Framer's layout and cutting guide | 7,059,061 | June 2006 | French, Don Gregory |
| Ruler | D571,239 | June 2008 | Holmes, David G. |
| Adhesive backed measuring tape | 7,581,333 B2 | September 2009 | Dressler, Gary S. |
| Tape measuring device | 2001/0042315 A1 | November 2001 | Dixon, Thomas J. |
| Methods and apparatus for providing reference measurements | 2002/0148134 A1 | October 2002 | Meyer, et al. |
| Flexible adhesive tape measure | 2005/0257393 A1 | November 2005 | Spanski, et al. |
| Template tape with indicia | 2007/0283589 A1 | December 2007 | Garcia, Nicholas C. |
| Framing layout tape | 2008/0201975 A1 | August 2008 | Gingerella, et al. |
| In-situ shear wall nailing template | 2008/0209749 A1 | September 2008 | Chua, Bryan S. M. |
| Measuring Band | 2008/0307666 A1 | December 2008 | Mattson, et al. |
| Manufacture for tape measure | JP57128801 | August 1982 | Nishikawa, Tsuguo |

The prior art for measurement style photographic aids consist of devices that measure human dimension, contours, etc. for specific medical purposes or use specific photographic techniques and mirrors to establish measurements. None of these are designed to provide measurement of an object or item of longer length. These patents, such as U.S. Pat. No. 4,370,039 or U.S. Pat. No. 4,639,107, are clearly designed for use by specifically trained persons using specialized procedures and equipment.

There are numerous prior art patents (such as U.S. Pat. No. 7,581,333 B2 or 6,772,532) for tape measures, all of which can be re-tasked for use as a photographic aid. Various tape measure patents adopt the use of adhesive backing, flexible and tearable substrate, and scales and markings. However, none of these tape measures are truly adequate for photographic means. In defining themselves as tape measures, the design is centered on creating scale markings to minute measurements down to 32nds and 64ths of an inch, and for the tape measure being small enough to be highly portable and readable at a very close distance. As an example, a camera placed three feet away from a tape measure placed beside an object or item is capable of capturing an image in which the measuring tape markings and scale are visible and readable but the field of view of the camera is limited to only a few feet. If a camera is moved far enough away to capture an image of substantial length such as the typical length of an office wall, the markings on the tape are too small to be easily read, and the markings are placed too close together to differentiate the individual markings in a photograph taken with a digital camera and the image viewed using standard software on a conventional computer. In using a typical digital camera and a ¾" wide steel measuring tape, the fractional inch markings become difficult to read when the lens is three feet from the source allowing approximately four feet of tape to be photographed. When viewed on a computer using standard photo viewing software these markings become difficult to read when the lens is five feet from the source allowing approximately six feet of tape to be photographed. The inch and foot marking become difficult to discern when the lens is placed seven feet from the source about nine feet of tape to be photographed.

The current art does not address the needs of a measuring tape that is to be used as a photographic aid for photographing measurements of an object or item of longer length. To accomplish this, a photographic aid measuring tape needs larger markings. These markings must be clearly defined. The markings must be spaced farther apart so as to not become confusing in a photograph. The device also needs markings to assist in identifying the location of the device in relation to the object or item being photographed, and in identifying the direction the photograph is being taken in, as well as identifying whether the device is located horizontally or vertically. Duplicate markings at the top and the bottom of the top surface of the substrate are needed to allow for accurate placement of the device against a perpendicular surface. The device must be able to be placed on or adjacent to the object or item that is to be photographed. For use with non-professional photographers, the device must be able to be used with little or no training and must not require highly specialized equipment.

BRIEF SUMMARY OF THE INVENTION

It is therefore an object of the present invention to provide markings large enough to be readable in a photograph taken using a digital camera and viewed using standard software on a conventional computer which achieves the above object.

It is a further object of the present invention to provide for markings that are specific and distinct which achieves the above object and which also is easily recognizable in the above mentioned photograph.

It is yet another object of the present invention to provide for markings spaced at ¼ inch increments which achieves the above objects and which also makes the markings discernable in the above said photograph.

It is yet another object of the present invention to provide markings which achieves the above objects and which also assists in identifying the invention location, direction and horizontal or vertical attitude.

It is yet another object of the present invention to provide markings that are located the same on the top and bottom edges of the top surface of the substrate which achieves the above objects and which also allow for accurate alignment to perpendicular surfaces.

It is yet another object of the present invention to provide a device that can be attached to or adjacent to the object or item being photographed which achieves the above objects.

It is yet another object of the present invention to provide a device that can be used with little or no technical training allowing for use by the average user of a digital camera which achieves the above objects.

The invention achieves the above objects, and other objects and advantages which will become apparent from the description which follows, by providing an adhesive backed, flexible, tearable substrate measuring tape of large width with large scales and markings spaced at substantial increments that allows an average user to affix the invention to an object or item and be photographed using a digital camera and then viewing the image using standard software on a conventional computer.

In the preferred embodiments of the invention, the photographic aid measuring tape is provided with a thin, flat, flexible, tearable substrate having scales and markings printed on one side and having an adhesive backing on the other side. It will be at least two inches in width as measuring tapes smaller than two inches in width do not allow for markings large enough or distinctive enough to be easily recognizable in a digital photograph taken of an object or item of long length such as a typical size office wall when the entire wall is photographed as a single picture and the image viewed using standard software on a conventional computer. A two inch wide tape will allow approximately ten feet of tape to be accurately photographed and read. A two and one-half inch wide tape will allow twelve to fourteen feet of wall to be accurately photographed and read. A three inch wide tape will allow up to fifteen feet of wall to be accurately photographed and read while a four inch wide tape will allow about eighteen feet of wall to be accurately photographed and read. The invention will not be wider than eight inches in width, since a larger width becomes awkward to handle and cumbersome, removing the advantage of ease of use.

The substrate is a flexible, relatively non-stretchable substance with a low tack adhesive on the back side and a flat, printable surface on top. The substrate will be a commercially available material, currently manufactured by several manufacturing companies. One possible product is Shurtape Model No. FP227 manufactured by Shurtape Technologies, LLC, Hickory, N.C.

The invention includes scales and markings ideally located to illustrate measurement and notation when the invention is attached to an object or item and photographed. The scale markings will indicate increments of ¼". Straight lines indicate ¼", ½" and ¾" segments between inch markings located along both width edges of the substrate. These straight line markings are sized at 25% of the overall width of the tape along one edge and 6.25% of the overall width of the tape along the other edge. At one inch intervals, inch markings are delineated both numerically and with an arrow, the point end of the arrow facing the outer edges along the width of the substrate and the fan end of the arrow facing toward the center of the top surface of the substrate. The number/arrow marking occurs along both width edges of the substrate. Each arrow is sized at 25% of the overall width of the tape. Each numerical designator is sized at 14.8% of the overall width of the tape. At one foot intervals, foot markings are delineated both numerically and with arrows, the point side of two arrows face in opposite directions toward the outer edges along the width of the substrate and the fan end of the arrows face toward the center of the top surface of the substrate. The number for the foot marking occurs between the two fan ends of the arrows at the center between the width of the top surface of the substrate. The foot marking arrows are sized at 36% of the overall width of the tape and the foot marking numerical indicator is sized at 25% of the overall width of the tape. Along one edge of the top surface of the substrate, at each measuring mark, a unique identifier of the measuring mark is shown. This is preferably shown symbolically using marks similar to bar codes or in feet, inches and fractions of an inch such as 0' 0¼", etc. The size of these markings is 23% of the size of the numerical inch marking identifiers. The size of the symbols, numbers and markings are of sufficient size to allow for easy identification when photographed and the image viewed using standard software on a conventional computer.

Other markings on the invention allow for specific identification of the object or item being measured and digitally photographed. These specific identifiers include the notation HOR to identify the invention is attached to show a horizontal surface is being photographed, VER to identify the invention is attached to show a vertical surface is being photographed, letters NS WE for use as directional indicators, and two spaces identified with underlines for use to write in specific identifiers to aid the viewer of the photograph. The size of these specific identifiers is approximately 8% of the overall width of the tape.

The invention is useful in many situations and environments. Its ability to allow for direct marking on the substrate and its size allow for photographic evidence of an object or item to be documented and recorded. For example, long wall dimensions can be photographed for long term evidence of wall measurements. Another example is for an automobile accident investigation where this invention can be placed adjacent to a vehicle's skid marks to photograph the length of the skid marks. Because these types of marks are typically many tens of feet long, this tape is of sufficient size to be photographed and provide readable documentation when viewed using standard software on a conventional computer Though the invention as discussed above is primarily centered toward use as a photographic aid when photographically documenting walls, ceilings and floors, the scope of coverage of this patent is not intended to be limiting. This invention provides a unique ability over any other photographic aid or measuring tape currently available in that its large physical size, its large characters and numerals, its unique symbols and its writeable surface all allow for photographic readable evidence of longer distances to be achieved.

DETAILED DESCRIPTION OF THE PREFERRED EMBODIMENTS

Figure 1:
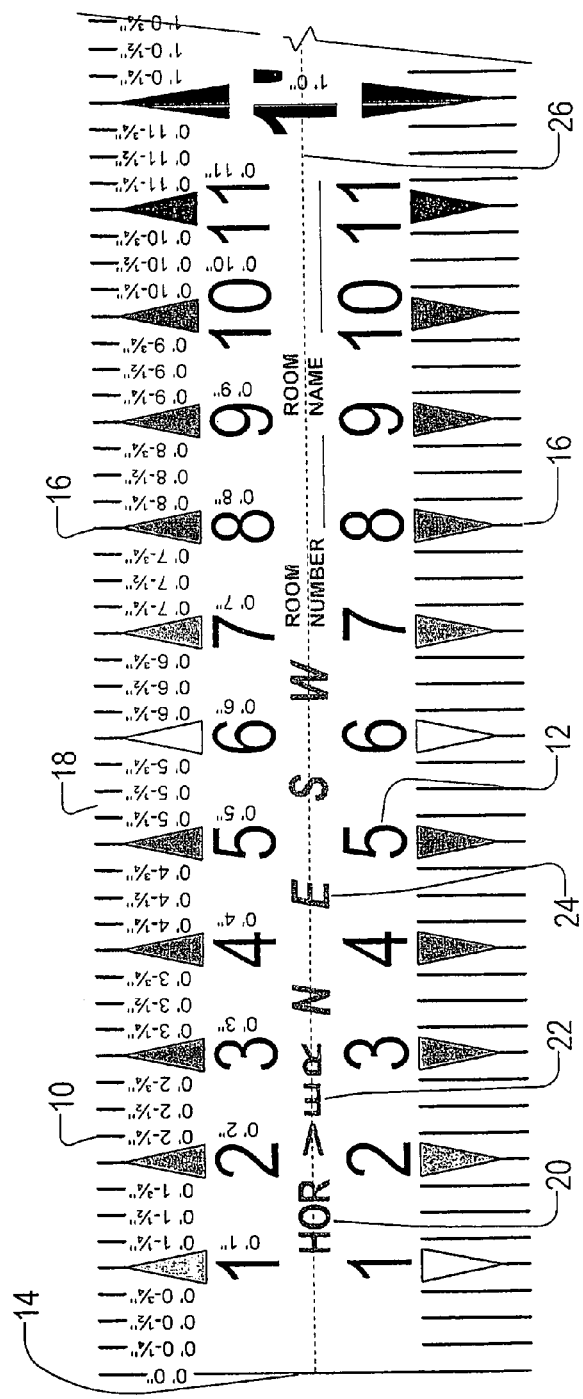
FIG. 1 is a life size, top view of a portion of the invention, a photographic aid measuring tape.

A photographic aid measuring tape, in accordance with the principles of the invention is generally indicated at reference numeral 10 in the various Figures of the attached drawings wherein like numbered elements in the Figures correspond to like numbered elements herein.

Figure 2:
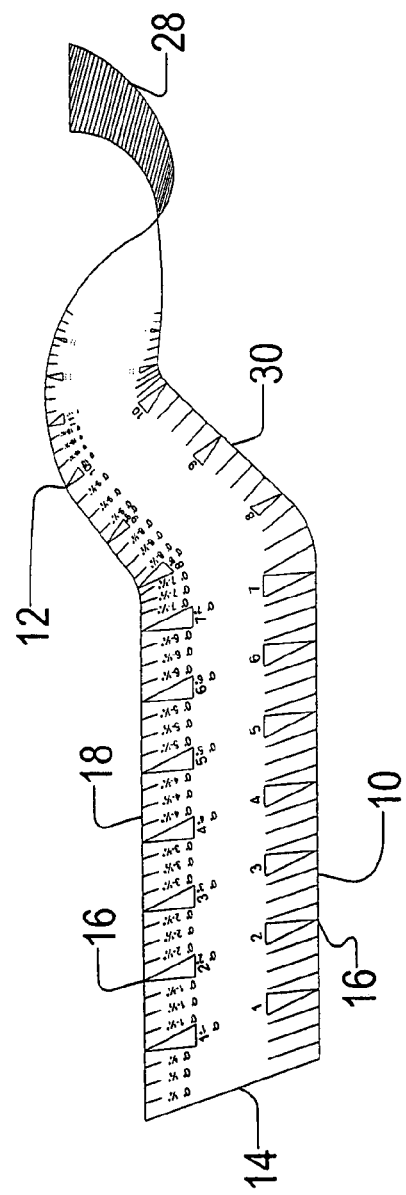
FIG. 2 is a perspective view of a portion of the invention, a photographic aid measuring tape.

In FIG. 2, the photographic aid measuring tape is illustrated as including numerals, characters, symbols and markings 12 printed on a top surface 30 of a commercially available, adhesive backed, flexible, tearable substrate 28. Specific benefits of the numerals, characters, symbols and markings will become evident.

Figure 3:
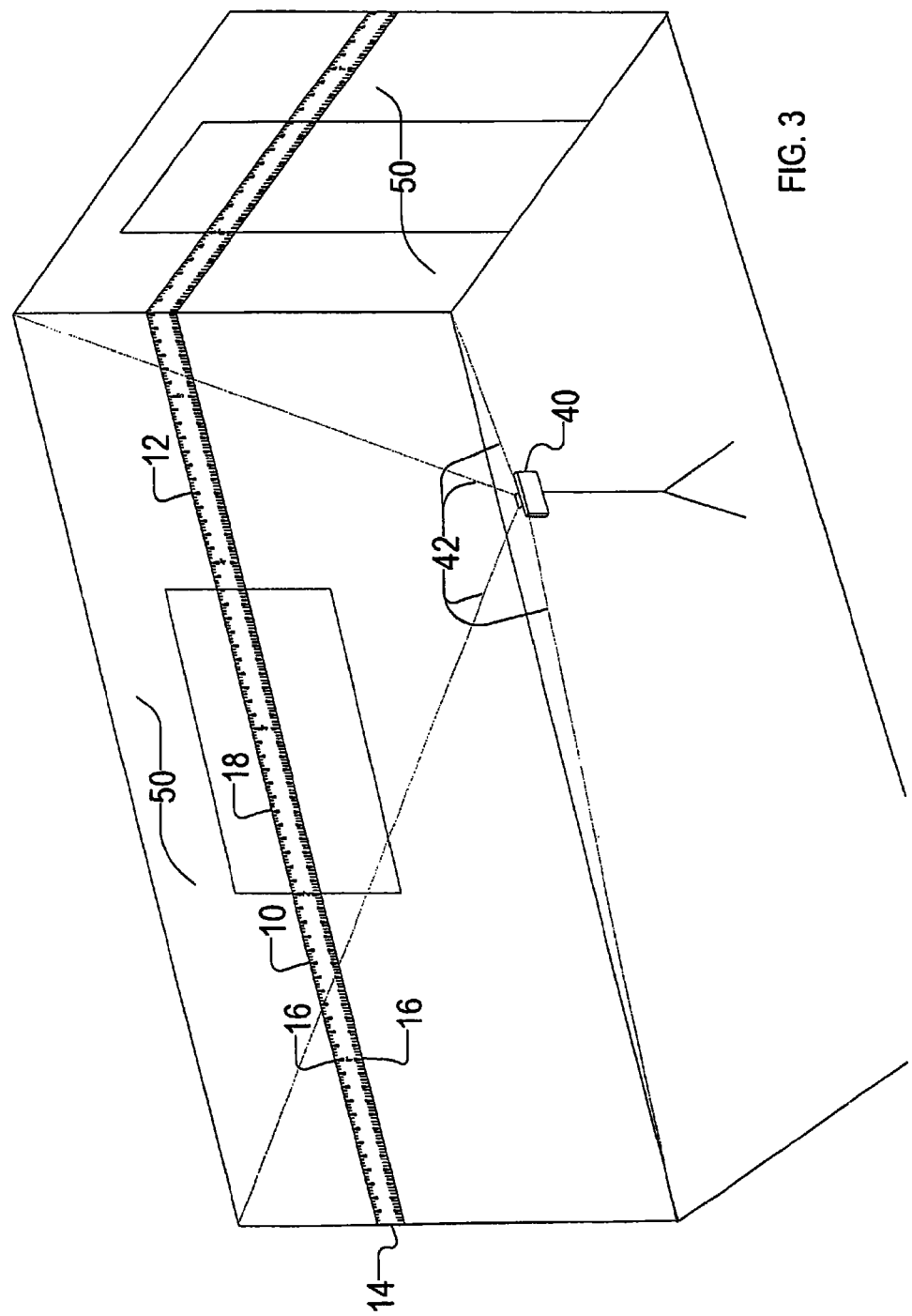
FIG. 3 is a perspective view of a room in which the invention, a photographic aid measuring tape, is being utilized.

The photographic aid measuring tape illustrated in FIGS. 1, 2, and 3 has a width 14 of between two inches and eight inches. Typical commercially available measuring tapes are between one-half inches and one and one-half inches in width. These narrow widths do not allow for markings large enough to be easily read from a distance. The photographic aid measuring tape being between two inches and eight inches in width allows for numerals, characters, symbols and markings to be large enough to be easily recognizable in a photograph taken of an object or item of long length such as a typical length office wall 50 of approximately ten feet in length when the wall is photographed using a digital camera 40 and its field of view 42 becomes the entire wall length which becomes a single photograph and the resulting image is then viewed using standard software on a conventional computer. The photographic aid measuring tape, when having a width greater than eight inches becomes awkward to handle and cumbersome, removing the advantage of ease of use.

As illustrated in FIGS. 1, 2, and 3, the photographic aid measuring tape has similar markings 16 at the top and bottom of the top surface of the substrate. The similar markings allow for alignment of the photographic aid measuring tape to a perpendicular surface to that object or item being photographed, thus allowing for a more accurate placement of the invention.

Individual line markings 18, best illustrated in FIG. 1 but also shown in FIGS. 2 and 3, are spaced at ¼ inch intervals allowing for distinct separation of markings. The scale has markings indicating increments of ¼ inch. Straight lines indicate ¼ inch, ½ inch and ¾ inch segments between inch markings located along both width edges of the substrate. At one inch intervals, inch markings are delineated both numerically and with an arrow, the point end of the arrow facing the outer edges along the width of the substrate and the fan end of the arrow facing toward the center of the top surface of the substrate. The number/arrow marking occurs along both width edges of the substrate. At one foot intervals, foot markings are delineated both numerically and with arrows, the point side of two arrows face in opposite directions toward the outer edges along the width of the substrate and the fan end of the arrows face toward the center of the top surface of the substrate. The number for the foot marking occurs between the two fan ends of the arrows at the center between the width of the top surface of the substrate. Along one edge of the top surface of the substrate, at each measuring mark, a unique identifier of the measuring mark is shown. This may be shown symbolically using marks similar to bar codes or in feet, inches and fractions of an inch such as 0' 0¼", etc. The size of the symbols, numbers and markings are of sufficient size to allow for easy identification when photographed using a digital camera and the image viewed using standard software on a conventional computer.

FIG. 1 illustrates other markings on the tape that allow for specific identification of the object or item being photographed. These specific identifiers include: the notation HOR 20 to identify the invention is being used to document a horizontal surface is being photographed; VER 22 to identify the invention is being used to document a vertical surface is being photographed; letters NS WE for use as Directional Indicators 24; two spaces identified with underlines for use to write in specific identifiers to aid the viewer of the photograph; a Centerline Identifier 26 is included to allow for more accurate placement along a line segment.

As best illustrated in FIG. 2, the substrate 28 is a commercially available substrate made of a flexible, relatively non-stretchable substance with a low tack adhesive on the back side and a flat, printable surface on the top side. Several possible products are currently manufactured that can accomplish the requirements for the substrate. The low tack adhesive enables the invention to adhere to the surface of an object or item while being measured and photographed and then can be readily removed and discarded.

Those of ordinary skill in the art will conceive of other alternate embodiments of the invention upon reviewing this disclosure. Thus, the invention is not to be limited to the above description, but is to be determined in scope by the claims which follow.

I claim:

1. A photographical aid measuring tape, comprising: a substrate having numerals, characters, symbols and markings of a sufficient size on a top side of the substrate of sufficient width so that the numerals, characters, symbols and markings allow for recognition in digital photography when viewed using standard software on a conventional computer monitor such that when the tape is positioned on a room surface to be measured and a conventional digital photograph is taken of the surface and the tape, the numerals, characters, symbols and markings can be perceived in the photograph.

2. The photographic aid measuring tape of claim 1 wherein the sufficient width includes a range of a minimum 2 inch width and a maximum 8 inch width whereby allowing for dimensional clarity in digital photography along with portability and ease of use.

3. The photographic aid measuring tape of claim 1 including complimentary markings at the top edge and the bottom edge of the top surface of the substrate whereby the invention can be accurately placed against perpendicular surfaces.

4. The photographic aid measuring tape of claim 1 including line markings at ¼ inch intervals allowing for easy recognition of the numerals, characters, symbols and markings in a photograph due to increased spacing of the marks.

5. The photographic aid measuring tape of claim 1 wherein the characters include horizontal HOR and vertical VER markings establishing horizontal and vertical direction in a digital photograph.

6. The photographic aid measuring tape of claim 1 wherein the symbols include directional aid markings N, S, E, W.

7. The photographic aid measuring tape of claim 4 wherein the markings include a unique identifier at each line marking whereby specific line markings can be identified when digitally photographed and read using specific optical character recognition software.

8. The photographic aid measuring tape of claim 1 wherein the markings include a centerline marking whereby accurate placement can be obtained when attached along a line segment.

9. A method for measuring a surface in a room comprising:

placing a photographic aid measuring tape having numerals, characters, symbols and markings of sufficient size on a substrate of sufficient width to be recognized in a digital photograph of the surface;

placing the tape against the surface;

taking a digital photograph of the tape on the surface; and viewing the photograph on a conventional computer monitor.

\* \* \* \* \*